Patented May 4, 1926.

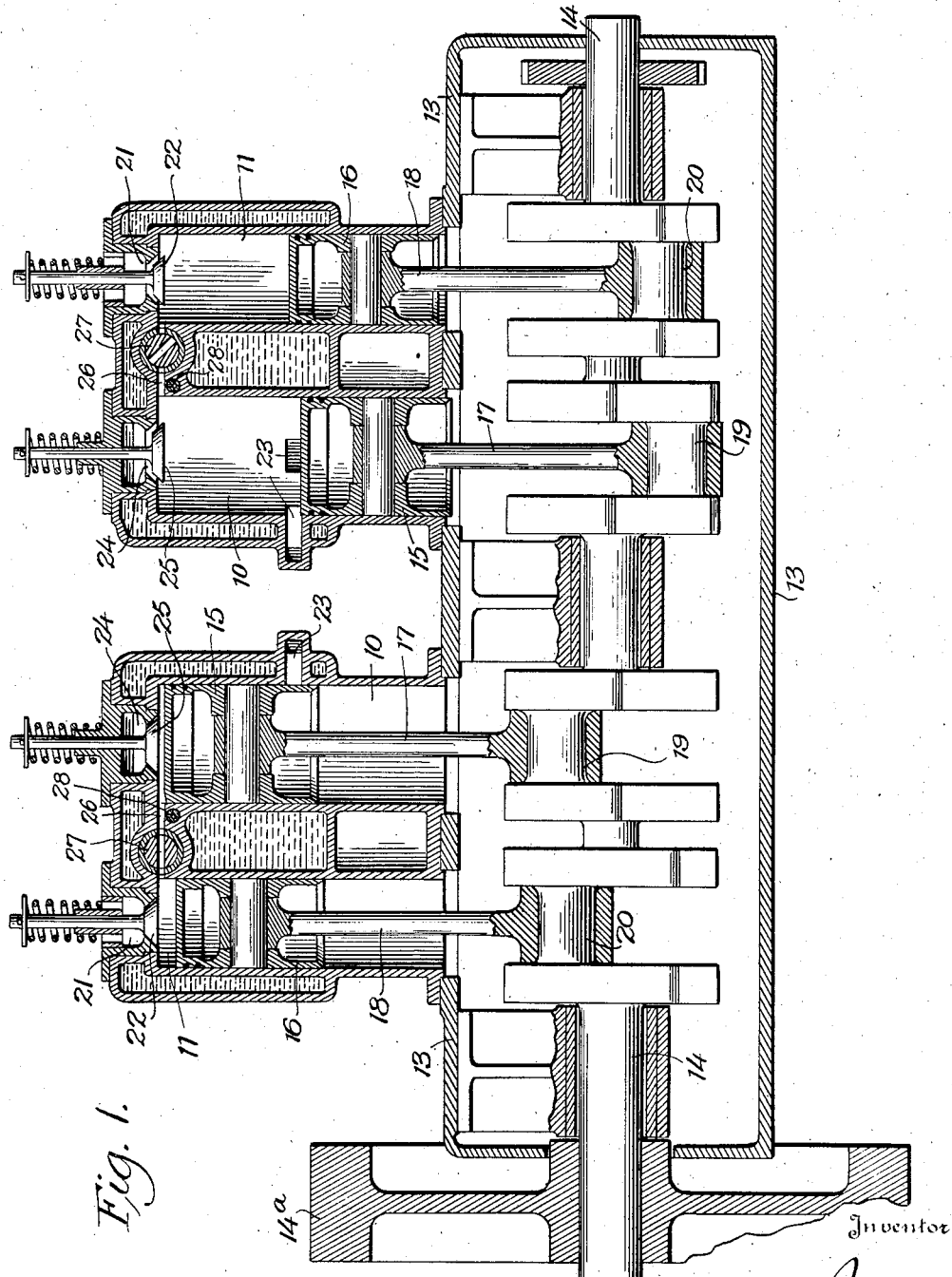

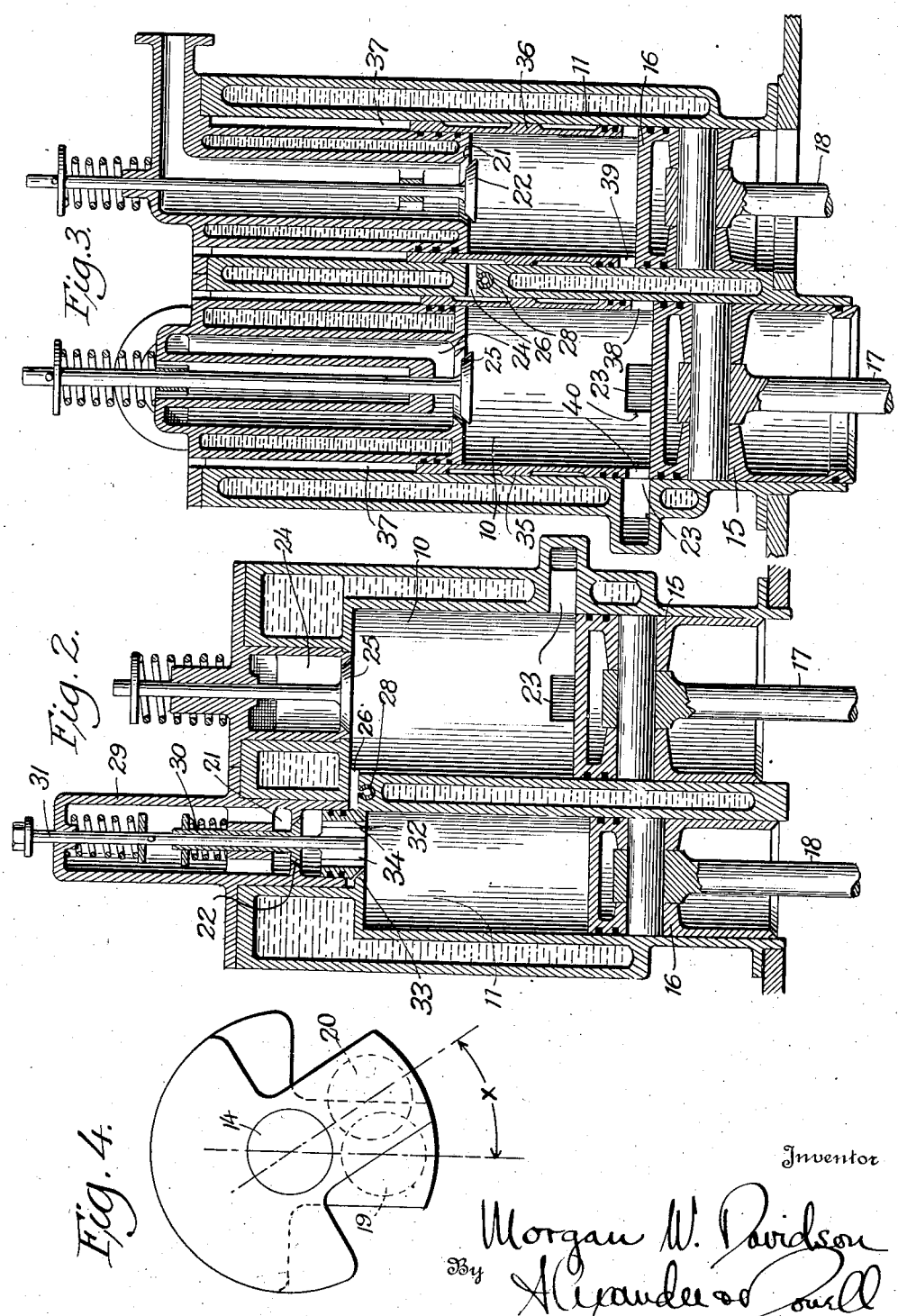

1,583,668

UNITED STATES PATENT OFFICE.

MORGAN W. DAVIDSON, OF VERMILION, SOUTH DAKOTA.

2-CYCLE INTERNAL-COMBUSTION ENGINE.

Application filed January 14, 1924. Serial No. 686,212.

*To all whom it may concern:*

Be it known that I, MORGAN W. DAVIDSON, a citizen of the United States, residing at Vermilion, in the county of Clay and State of South Dakota, have invented certain new and useful Improvements in 2-Cycle Internal-Combustion Engines; and I hereby declare that the following is a full, clear, and exact description thereof, reference being had to the accompanying drawings, which form part of this specification.

This invention is an improvement in internal combustion engines, and the principal object thereof is to provide a novel 2-cycle internal combustion engine of the single or multiple unit type, each unit comprising two separate cylinders, namely, a combustion cylinder, and an air compression cylinder, each cylinder having its own piston reciprocably mounted therein, and operated from a common crank shaft, the cranks for the respective pistons of each unit being set at such angularity to each other as to permit the pressure in the compression cylinder to be the desired amount when the piston in the combustion cylinder has reached its extreme upward travel or has reached the upper end of its stroke. At this stage in the stroke of the combustion cylinder, compressed air from the air compression cylinder is delivered through a suitable valved passage or duct into the combustion cylinder.

Simultaneously with the delivery of the compressed air to the compression cylinder, liquid fuel is injected by means of a suitable cam operated pump, into said passage or duct, at a point between the two cylinders, and said liquid fuel is injected into the stream of compressed air, and is thoroughly mixed therewith and vaporized thereby, the amount of fuel injected being controlled either by a by-pass arrangement of the pump delivery, or by means of a variation in the pump stroke.

Ignition of the mixture of air and fuel will be effected by the heat of compression of the air and fraction of the products of combustion in the combustion cylinder upon the delivery of the air and fuel into the combustion cylinder. The fuelizing of the air after compression and prior to delivery to the combustion cylinder permits high compression in both the combustion and compression cylinders, with its accompanying gain in efficiency, and without danger of pre-ignition of the fuel mixture.

The degree of compression of the fraction of the products of combustion which are utilized for ignition, is preferably controlled by regulating the time of closure of an auxiliary exhaust valve in the combustion cylinder. As air compression is effected in a separate cylinder from that used for combustion and explosion, the ratio of expansion is entirely independent of the compression ratio, thus allowing complete expansion regardless of the compression.

Also, the injection of the fuel into the flowing stream of air during its passage from the compression cylinder to the combustion cylinder, will result in a thorough mixing of the fuel and air to give efficient combustion, and igniting the mixture of fuel and air by injection into the highly heated compressed products of combustion will result in efficient ignition, and eliminates the usual external ignition systems irrespective of the compression pressure used.

Due to the period involved in the mixing of the fuel and air the tendency towards explosive combustion is eliminated.

The engine is suited to any liquid fuel, and the design offers fewer and better arranged valves than are used with the types of engines now on the market.

Other minor objects of the invention will be hereinafter set forth.

I will explain the invention with reference to the accompanying drawings which illustrate practical embodiments thereof to enable others to adopt and use the same, and will summarize in the claims the essential features of the invention, the novel features of construction, and novel combinations of parts, for which protection is desired.

In the accompanying drawings—

Fig. 1 is a vertical sectional view of my preferred type of engine, showing the arrangement of oscillatory transfer valves for controlling the delivery of compressed air to the combustion chamber.

Fig. 2 is a vertical sectional view of one unit of the engine, illustrating the use of poppet type valves for governing the delivery of compressed air and fuel to the combustion cylinder;

Fig. 3 is a view similar to Fig. 2 illustrating the use of a piston sleeve valve; and Fig. 4 is a view showing the angular relation between the cranks of the crank shaft for the pistons of the respective combustion and compression cylinders of each unit.

Referring to Fig. 1, the numerals 10 represent the combustion or expansion cylinders, and 11 the compression cylinders, said cylinders being mounted on the usual crank case 13, in which is housed the crank shaft 14, carrying the fly-wheel 14ª. Each combustion cylinder 10 is provided with a piston 15, and each compression cylinder 11 is provided with a piston 16, pistons 15 and 16 being connected respectively to the cranks 19 and 20 of the crank shaft 14, by means of piston rods 17 and 18, in the usual manner.

Cranks 19 and 20 of each unit are disposed at such angularity to each other, as shown in Fig. 4, as to permit the pressure in the compression cylinder 11 to be the desired amount when the piston 15 of the combustion cylinder has reached the top or upper end of its stroke, piston 15 operating slightly in advance of piston 16. The relation of the pistons 15 and 16 when the former has reached the upper end of its stroke is illustrated in the two cylinders at the left of Figure 1 and their relation when piston 15 has reached its lower extreme position is illustrated in the two cylinders at the right of the figure. The angularity between the cranks 19 and 20 is shown at æ in Fig. 4.

Each compression cylinder 11 is provided with an air intake port 21 through which the air supply is governed by means of a spring controlled valve 22. Each combustion cylinder 10 is provided with the usual exhaust ports 23, formed in the walls of the cylinder, adjacent the lower end of its piston stroke to permit the discharge of the products of combustion therefrom when the piston 15 is at or near the lower end of its stroke, and each combustion cylinder 10 is further provided with an auxiliary exhaust port 24 at the top of the cylinder 10 which port is normally closed by means of a spring controlled valve 25.

A passage or duct 26 forms a communication between the combustion cylinder 10 and compression cylinder 11 of each unit, and is located near the top of the cylinders. This passage or duct 26 is provided as shown in Fig. 2, with a ported oscillating transfer valve 27 for controlling the delivery of compressed air from the compression cylinder to the combustion cylinder. A conduit is formed in the wall between the cylinders 10 and 11, communicating with the passage or duct 26, for the delivery of liquid fuel to said duct 26 when valve 27 is open.

The valves 22, 25 and 27 are controlled and operated by means of suitable valve operating mechanism of the usual type preferably driven from the crank shaft, and the amount of fuel injected through the conduit 28 into the duct 26 is regulated either by varying the stroke of the fuel delivery pump, or by means of a suitable by-pass arrangement of the pump delivery.

In the operation of the engine shown in Fig. 1, the intake valve 22 will be opened and air drawn into the compression cylinder 11 on the down stroke of its piston 16. The opening of this valve, however will be slightly delayed beyond the end of the up-stroke of the piston 16, in order that the compressed air filling the clearance space of the compression cylinder 11, will be allowed to expand to atmospheric pressure.

During the admission of air to the compression cylinder 11, the combustion cylinder is undergoing its working stroke, all valves in the combustion cylinder being closed.

As the piston 15 nears the end of its downward stroke the exhaust ports 23 in the combustion cylinder are uncovered, and the exhaust gases or products of combustion will escape through these ports into the atmosphere or into a suitable exhaust manifold.

At the end of the firing stroke, of the combustion cylinder, the auxiliary exhaust valve 25 will also open permitting some of the waste products of combustion to escape therethrough, and during the upward stroke of the piston 15 exhaust will continue through valve 25 until the auxiliary exhaust valve 25 is closed sometime before the piston 15 reaches the upward limit of its travel. Upon closure of the auxiliary exhaust valve 25, the remainder of the products of combustion in the combustion cylinder 10 will be compressed until the end of the upward stroke of piston 15, to furnish the heat of compression for firing the next succeeding charge injected to the combustion cylinder.

On the upward stroke of the piston 16 the air which has been admitted to the cylinder 11, will be highly compressed, the intake valve 22 of the cylinder 11 being closed. The compression continues in the two cylinders 10 and 11 until the pistons 15 and 16 of the cylinders approach the upper limits of their strokes, when the transfer valve 27 is opened thereby causing a stream of compressed and heated air to be delivered from the compression cylinder 11 to the combustion cylinder 10. Liquid fuel is simultaneously injected from the conduit 28 into the passage 26, and hence into flowing stream of compressed air and said liquid fuel becomes thoroughly mixed with the heated compressed air from the cylinder 11, and is vaporized thereby. The delivery of the fuelized air into the heated and compressed products of combustion in the cylinder 10, will result in ignition of the fuel mixture and combustion will progress throughout the delivery of fuelized air to the combustion chamber.

The transformation of the heat energy into mechanical energy developed during combustion, will be accomplished by the expansion of the air and products of combustion during combustion until the end of the expansion stroke.

When the piston 16 has reached the end of its upward stroke and has ceased to deliver compressed air to the combustion cylinder 10, communication between the two cylinders 10 and 11 will be automatically cut off by the closing of the valve 27, and at the same time the fuel supply will be automatically cut off.

In starting the engine the auxiliary exhaust valve 25 is closed earlier than when the engine is running normally, so that the heat of compression of the air in the combustion cylinder clearance space will be sufficient to ignite the fuel, but as soon as combustion has begun the auxiliary exhaust valve will be readjusted for a later closing to reduce the compression of the fraction of the products of combustion which remain in the combustion cylinder, after each explosion. The high initial temperature of the products of combustion does not require high compression to bring them to an igniting temperature. The adjustment of the exhaust valve 25, for an early or late closing, may be effected by manually controlled means.

In the construction shown in Figure 2, the engine operates substantially the same as the engine shown in Fig. 1, the difference in construction residing in the valve arrangement for controlling the delivery of fuel and air from the compression cylinder 11 to the combustion or expansion cylinder 10. In this construction, the air intake valve 22, is carried by a valve casing 29 seated in the engine head. The stem 30 of the valve 22, is hollow to receive a sliding stem 31 of a poppet valve 32, which engages a seat 33, formed in the lower end of the engine head. The poppet valve 32 is connected to the stem 31 by a series of webs 34, for the purpose of forming a passage through the center of the valve 32. The poppet valve 32 is so seated in the head of the engine as to normally close the passage 26 and prevent the air from being discharged from the cylinder 11 into the cylinder 10, until the valve 32 is raised. When the valve 32 is raised the compressed air from the cylinder 11 will pass through the passage 26 and into combustion cylinder 10, and the fuel oil from the conduit 28 will be injected into the flowing stream of compressed air in duct 26, resulting in a thorough mixing of the fuel and air, and a thorough vaporization of the fuel oil, thereby causing efficient combustion, as in Fig. 1, and the air and fuel will be delivered into the cylinder 10 where it will be ignited by the compressed products of combustion.

In the construction shown in Figure 3, another form of valve arrangement is shown wherein sleeve valves 35 and 36 are formed on the heads of the pistons 15 and 16, said valves operating in guides 37 formed between the cylinder walls and the engine head. Each sleeve valve 35 and 36 is provided with a port of opening 38, 39, located adjacent the heads of the pistons 15 and 16. These ports 38 and 39 are adapted to register with the passage 26, forming the communication between the cylinders 10 and 11, when compressed air and fuel from the cylinder 11 is to be delivered to the cylinder 10. The passage 26 will be closed at each end by the sleeve valves 35 and 36, excepting when the ports 38 and 39 are brought in register therewith.

Sleeve valve 35 of the combustion cylinder 10 is provided with additional openings 40, adapted to register with the exhaust ports 23 of the engine, for the passage of the waste products of combustion from cylinder 10.

In these various forms of construction above shown provision has been made for controlling the delivery of compressed air to the combustion cylinder 10 through the passage 26; also provision has been made for the delivery of the liquid fuel, into this passage instead of directly into the combustion cylinder, as in such case the fuel would be compressed with the fraction of products of combustion remaining in the expansion cylinder and might cause premature explosion.

In my invention the fuel is delivered into the stream of compressed and heated air passing from the compression cylinder 11 into the combustion cylinder, and the fuel is thoroughly mixed therewith, and is vaporized by the heat of compression of the air. By utilizing the heat of the compressed products of combustion for igniting the charge, ignition will thus be independent of the degree of compression of the air.

My novel engine provides fewer, and better arranged valves than the types of engines now on the market, and as air compression is effected in a separate cylinder from that used for combustion, the ratio of expansion will be entirely independent of the compression ratio, thus permitting complete expansion, regardless of compression. Also, the injection of the fuel into the flowing stream of air during its passage from the compression cylinder to the combustion cylinder, will result in a thorough mixing of the fuel and air, and a consequent efficient combustion. Furthermore, ignition by means of the injection of the mixture of fuel and air into the highly heated body of compressed products of combustion filling the clearance space of the expansion cylinder, will result in efficient ignition, and the elimination of external ignition systems irrespective of the compression pressure used. Also, fuelizing the air after compression, rather than before, permits high compression with its accompanying gain in efficiency, without danger of pre-ignition.

I claim:

1. An engine comprising a combustion cylinder, a compression cylinder for compressing air, a passage for delivering the compressed air to the combustion cylinder, a valve in said passage for controlling the delivery of the compressed air to the combustion cylinder, and means for injecting liquid fuel into the compressed air during its delivery from the compression cylinder to the combustion cylinder.

2. An engine, comprising a combustion cylinder, a compression cylinder for compressing air, a passage for delivering the air to the combustion cylinder after compression, a valve in said passage, and means for injecting liquid fuel into the air during its delivery to the combustion cylinder, thereby causing the fuel and air to be mixed and the fuel vaporized, said fuel mixture being ignited on entering the combustion cylinder by the heat of compression in the combustion cylinder.

3. In an internal combustion engine, the combination of a combustion and a compression cylinder having a communicating passage therebetween through which the compressed air is delivered to the combustion cylinder from the compression cylinder, means for controlling the admission of the compressed air through the passage, and means for injecting fuel into the passage and path of the compressed air as it is being delivered to the compression cylinder.

4. An internal combustion engine, comprising a combustion cylinder, an air compression cylinder, a passage for directing compressed air from the compression cylinder to the combustion cylinder, a valve for said passage and means for injecting liquid fuel into the passage when the valve is opened, whereby said liquid fuel will be vaporized by and mixed with said compressed air.

5. An internal combustion engine having a plurality of units, each unit comprising a combustion chamber, and air compression chamber, a passage for directing compressed air from the compression to the combustion chamber, a valve for said passage, and means for injecting liquid fuel into said passage when said valve is opened, whereby said liquid fuel will be mixed with and vaporized by the compressed air passing into the combustion chamber.

6. A 2-cycle internal combustion engine having a plurality of units, each unit comprising a combustion chamber; an air compression chamber, a passage connecting the upper ends of said combustion and compression chambers, a valve in said passage for controlling the admission of compressed air to said combustion chamber, and means for injecting liquid fuel into said passage when said valve is opened, whereby said liquid fuel will be mixed with and vaporized by the compressed air passing into the combustion chamber.

7. A 2-cycle internal combustion engine having a plurality of units, each unit comprising a combustion chamber, an air compression chamber, a passage connecting the upper ends of said combustion and compression chambers in each unit, a valve in said passage, means for injecting liquid fuel into said passage when said valve is opened, whereby said liquid fuel will be mixed with an vaporized by the compressed air passing into the combustion chamber and means for controlling the amount of fuel supply.

8. An internal combustion engine comprising a combustion cylinder; an air compression cylinder; a piston in said combustion cylinder; a piston in said compression cylinder; means for operating the combustion cylinder piston in advance of the compression cylinder piston; an air intake valve for said compression cylinder; an exhaust valve in said combustion cylinder; an auxiliary exhaust valve in said combustion cylinder; means for opening said auxiliary valve during a part of the return stroke of said combustion cylinder piston; a passage connecting the upper ends of the combustion and compression cylinders; a valve for said passage; and a conduit communicating with said passage for injecting liquid fuel into said passage when said valve is opened, whereby the liquid fuel will be vaporized by and mixed with the compressed air passing into the combustion chamber.

9. An internal combustion engine having a plurality of units; each unit comprising a combustion cylinder; an air compression cylinder; a piston in said combustion cylinder; a piston in said compression cylinder; means for operating the combustion cylinder piston in advance of the compression cylinder piston; an air intake valve for said compression cylinder; an exhaust valve in said combustion cylinder; an auxiliary exhaust valve in said combustion cylinder; means for opening said auxiliary valve during a part of the return stroke of said combustion cylinder piston; a passage connecting the upper ends of the combustion and compression cylinders of each unit; a valve in said passage; and a conduit communicating with said passage for injecting liquid fuel into said passage when said valve is opened, whereby the liquid fuel will be vaporized by and mixed with the compressed air passing into the combustion chamber.

10. A two-cycle internal combustion engine having a plurality of units; each unit comprising a combustion cylinder; an air compression cylinder; a piston in said combustion cylinder; a piston in said compression cylinder; said pistons being connected to a common crank shaft with the combustion cylinder piston operating in advance of the compression cylinder piston; an air intake valve for said compression cylinder; an exhaust valve in the wall of said combustion cylinder at or near the lower end thereof; an auxiliary exhaust valve in the head of said combustion cylinder; means for opening said auxiliary valve during a part of the return stroke of said combustion cylinder piston; a passage connecting the upper ends of the combustion and compression cylinders of each unit for delivering compressed air to the combustion cylinder; a valve in said passage; means for injecting liquid fuel into said passage when said valve is opened, whereby the liquid fuel will be vaporized by and mixed with the compressed air passing into the combustion chamber.

11. The herein described method of operating internal combustion engines, having a combustion chamber and a separate air compression chamber, consisting in admitting air into the compression chamber during the firing stroke, exhausting part of the waste products of combustion from the combustion chamber at the end of the firing stroke, said exhaust continuing during a part of the return stroke; compressing the air in the compression chamber and the remaining products of combustion in the combustion chamber during the return stroke, admitting said compressed air into the combustion chamber near the end of the return stroke; and injecting liquid fuel into the stream of compressed air passing to the combustion chamber, whereby said liquid fuel is vaporized and mixed with said compressed air; said mixture being ignited by the heat of compression of said waste products of combustion.

12. The herein described method of operating two-cycle internal combustion engines, having a combustion chamber and a separate air compression chamber, consisting in admitting air into the compression chamber during the firing stroke, exhausting part of the waste products of combustion from the combustion chamber at the end of the firing stroke, said exhaust continuing during a part of the return stroke; compressing the air in the compression chamber and the remaining products of combustion in the combustion chamber during the return stroke, whereby said air and combustion products are respectively raised to high temperature and pressure; admitting said compressed air into the combustion chamber near the end of the return stroke; and injecting liquid fuel into the stream of compressed air passing to the combustion chamber, whereby said liquid fuel is vaporized and mixed with said compressed air; said mixture being ignited by the heat of compression in the combustion chamber of said waste products of combustion.

13. In combination with an engine as set forth in claim 8, said valve for said passage comprising a sleeve integral with the upper end of said compression cylinder piston and engaging the walls of said cylinder; said sleeve having an opening therein adapted to register with said passage.

14. For an internal combustion engine having a compression cylinder and a combustion cylinder; and having pistons operable in said cylinders; a passage connecting the upper ends of said cylinders; and a sleeve on the upper end of said compression cylinder piston engaging the walls of said cylinder, and having an opening in the side walls of said sleeve, said opening being adapted to register with the said passage to establish communication between said cylinders.

15. In combination with an engine as set forth in claim 8, said valve for said passage comprising a sleeve integral with the upper end of said compression cylinder piston; a sleeve integral with the upper end of said combustion cylinder piston; said sleeves engaging the walls of their respective cylinders, and having openings therein adapted to register with the said passage to establish communication between the cylinders.

16. For an internal combustion engine having a plurality of units, each unit comprising separate compression and combustion cylinders, and having separate pistons for said cylinders; a passage connecting the upper ends of said cylinders in each unit; and a sleeve on the upper end of each piston engaging the walls of its cylinder, said sleeves having ports in their side walls adapted to register with the said passage to establish communication between the cylinders of each unit.

In testimony that I claim the foregoing as my own, I affix my signature.

MORGAN W. DAVIDSON.